United States Patent Office 2,879,155
Patented Mar. 24, 1959

2,879,155

METHOD OF MANUFACTURING BRIQUETTES AND OTHER BODIES FROM SERPENTINE

Merton H. Davey, Mechanicsburg, Pa., assignor to D & P Minerals, Inc., Harrisburg, Pa., a corporation of Pennsylvania No Drawing. Application September 16, 1958
Serial No. 761,286

8 Claims. (Cl. 75—3)

This invention relates to the manufacture of briquettes and other bodies from serpentine which is, of course, hydrous magnesium silicate, $H_4Mg_3Si_2O_9$.

As will be discussed more fully hereinafter, I have discovered that, when treated in a certain manner, serpentine may be converted into a body which is formed wholly or principally of Forsterite which is a magnesium silicate, $Mg_2SiO_4$; the said body having remarkable refractory properties and being characterized not only by mechanical adhesion and improved crushing strength, but by a bond wherein there is an actual chemical integration of the particles at their interfaces.

Another object is the attainment of the foregoing results in a manner which is both simple and inexpensive.

As an example of the great utility of the method of the present invention, chrome ores may be very effectively briquetted thereby.

As is well known, chrome ores are quite expensive; and very substantial quantities thereof assume a powdered or finely divided form which renders them either undesirable or completely unfit for various uses. Such ores are, in many instances, homogeneous mixtures of $Cr_2O_3$, FeO, CaO, MgO, $SiO_2$, $Al_2O_3$; and any additions of Fe (iron), Ca (calcium), Mg (magnesium) or Si (silicon) depreciate their salable value.

The most common chrome ore gangue material is, of course, serpentine which, as before mentioned, consists essentially of a hydrous magnesium silicate, $H_4Mg_3Si_2O_9$.

According to the teachings of the present invention, certain chrome ores containing serpentine (such, for example, as antigorite from the area of Easton, Pennsylvania) may be so briquetted as to acquire a bond of the type referred to hereinbefore in which recrystallization produces a Forsterite structure. As will be understood by those skilled in the art, such briquettes are highly desirable for many commercial operations.

I have obtained excellent results by adding to finely divided chrome ores containing serpentine borax approximating 25% of the contained serpentine, and hot water in the ratio of approximately 6% by weight, then thoroughly mixing the mineral composition and forming it into briquettes of the desired size and shape, the briquettes so formed then being dried and fired at temperatures as low as 650° C. However, acceptable results may be obtained with the inclusion of borax ranging between approximately 0.5% and approximately 1.5%.

It will be understood by those skilled in the art that temperatures even lower might be utilized, provided the briquettes are subjected thereto for a sufficient period of time.

If desired, bentonite in the amount of 0.5% to 1.0% may be supplied before the hot water is added simply to enhance plasticity and improve the green strength of the briquettes, this being disclosed in my patent application Serial No. 689,781, filed October 14, 1957, now abandoned, and in my patent application Serial No. 707,670, filed January 8, 1958.

The serpentine treated in the foregoing example was in the natural state, having had no prior chemical treatment.

It will be understood that there may be utilized chrome ores of different, but appropriate, quality which are mixed in the natural state, the ratio of around 3 chromium to 1 iron being observed in the manner well known in the art.

As illustrative of the advantages set forth earlier herein, two briquette samples produced in accordance with the teachings of the present invention were heated to temperatures of approximately 850° C. and approximately 1200° C., respectively, the first sample being found to have a crushing strength of approximately 3000 pounds per square inch, and the second sample a crushing strength of approximately 8000 pounds per square inch. Therefore, the strength of the bond produced by the addition of borax in the ratios described increases with increased process temperatures.

Microscopic examinations definitely prove that the solution of borax and borate coats each particle of the mineral composition and that, at elevated temperature, a changing chemical composition results at the joint interface as the temperature is raised above the initial fusion temperature of the anhydrous borax produced. Thus, varying amounts of the elements (oxides) present form a glass with the borax, the glass having an increasing eutectic as the temperature is increased.

Accordingly, the briquettes produced in the foregoing manner will be found to still be in form at 2100° C., and they become closer knit instead of disintegrating, as has been the problem of the binders of the prior art.

Differential thermal analysis studies of pure chromite show no deflections in the curves, demonstrating that the reactions determined for chromite ore are actually those of the gangue, i.e., the impurities, non-chromite minerals, and oxides, etc., of the ore. The normal and almost universally found gangue in chromite ore is serpentine. Differential thermal analysis studies of typical chrome ores yield similar curves.

Comparison of the aforementioned curves of typical chromite ore with curves published in the book "The Differential Thermal Investigation of Clays," edited by Robert C. MacKenzie, published by the Min. Soc. London, 1957, indicates the ore curves to be those of serpentine which is, as mentioned before, the most common chrome ore gangue mineral.

The differential thermal analysis curves of serpentine indicate two reactions:

(1) An endothermic at about 690° C.; and
(2) An exothermic at 780° to 815° C.

I have established by X-ray studies that the endothermic peak at 690° C. in serpentine is dehydroxylization, leaving amorphous magnesia and silica $(3MgO.2SiO_2.2H_2O$ @ 690° $C.=2H_2O 3MgO+2SiO_2)$ 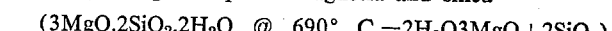

The exothermic peak at 815° C. is caused by crystallization of the amorphous material to Forsterite, $Mg_2SiO_4$.

I have discovered that borax, when used in the manner described hereinbefore, so reacts with the serpentine gangue as to flux the crystallization of Forsterite at temperatures of about 150° below normal. On the differential thermal analysis traces, the addition of borax to serpentine (1) Subdues the endothermic peak at 690° C.; and
(2) Subdues and lowers the temperature of the exothermic peak (700–815° C.).

Boron is classically a "mineralizer" in that it fluxes crystallization reactions; and it, therefore, appears that serpentine, upon dehydroxylization, immediately crystallizes to Forsterite due to the presence of borax as used in the manner described. This explanation requires that the endothermal dehydroxylization and exothermal crystallization occur penesimultaneously. If so, the complete reaction would take place in the 650–705° range. X-ray studies have proved this to be true.

According to the teachings of the present invention, ordinary (or pure) serpentine may, through the use of borax, etc., in the manner described, be converted to Forsterite and quartz, $SiO_2$; or burned magnesite, MgO, added to obtain a refractory body (such as fire brick) which is (at least theoretically) entirely Forsterite.

While I have shown and described certain specific embodiments of the present invention, it will be readily understood that I do not wish to be limited exactly thereto, since various modifications may be made without departing from the scope of the invention as defined in the appended claims.

I claim:

1. A method of briquetting serpentine which includes mixing therewith approximately 0.5% to approximately 1.5% of borax, adding water to the aforesaid mixture, mixing the water-containing composition, and forming it into briquetttes, drying said briquettes, and firing said briquettes at temperatures ranging upwardly from about 650° C., thereby fluxing the crystallization of Forsterite and producing a chemical integration of the particles at their interfaces.

2. A method of briquetting serpentine which includes mixing therewith approximately 0.5% to approximately 1.5% of borax, adding water to the aforesaid mixture in the ratio of approximately 6% by weight, mixing the water-containing composition, and forming it into briquettes, drying said briquettes, and firing said briquettes at temperatures ranging upwardly from about 650° C., thereby fluxing the crystallization of Forsterite and producing a chemical integration of the particles at their interfaces.

3. A method of briquetting serpentine which includes mixing therewith approximately 0.5% to approximately 1.5% of borax, adding water to the aforesaid mixture, mixing the water-containing composition, and forming it into briquettes, drying said briquettes, and firing said briquettes at temperatures ranging upwardly from about 690° C., thereby fluxing the crystallization of Forsterite and producing a chemical integration of the particles at their interfaces.

4. A method of briquetting serpentine which includes mixing therewith approximately 0.5% to approximately 1.5% of borax, adding water to the aforesaid mixture in the ratio of approximately 6% by weight, mixing the water-containing composition, and forming it into briquettes, drying said briquettes and firing said briquettes at temperatures ranging upwardly from about 690° C., thereby fluxing the crystallization of Forsterite and producing a chemical integration of the particles at their interfaces.

5. A method of briquetting serpentine which includes mixing therewith borax approximating 25% of the contained serpentine, adding water to the aforesaid mixture, mixing the water-containing composition, and forming it into briquettes, drying said briquettes and firing said briquettes at temperatures ranging upwardly from about 650° C., thereby fluxing the crystallization of Forsterite and producing a chemical integration of the particles at their interfaces.

6. A method of briquetting serpentine which includes mixing therewith borax approximating 25% of the contained serpentine, adding water to the aforesaid mixture in the ratio of approximately 6% by weight, mixing the water-containing composition, and forming it into briquettes, drying said briquettes and firing said briquettes at temperatures ranging upwardly from about 650° C., thereby fluxing the crystallization of Forsterite and producing a chemical integration of the particles at their interfaces.

7. A method of briquetting serpentine which includes mixing therewith borax approximating 25% of the contained serpentine, adding water to the aforesaid mixture, mixing the water-containing composition, and forming it into briquettes, drying said briquettes, and firing said briquettes at temperatures ranging upwardly from about 690° C., thereby fluxing the crystallization of Forsterite and producing a chemical integration of the particles at their interfaces.

8. A method of briquetting serpentine which includes mixing therewith borax approximating 25% of the contained serpentine, adding water to the aforesaid mixture in the ratio of approximately 6% by weight, mixing the water-containing composition, and forming it into briquettes, drying said briquettes, and firing said briquettes at temperatures ranging upwardly from about 690° C., thereby fluxing the crystallization of Forsterite and producing a chemical integration of the particles at their interfaces.

References Cited in the file of this patent

FOREIGN PATENTS

| | | |
|---|---|---|
| 9,210 | Great Britain | Apr. 18, 1906 |
| 17,246 | Great Britain | Aug. 17, 1908 |
| 19,351 | Great Britain | Sept. 3, 1902 |